United States Patent
Yin et al.

(10) Patent No.: US 10,485,025 B2
(45) Date of Patent: Nov. 19, 2019

(54) SYSTEMS AND METHODS FOR PERFORMING CHANNEL SENSING FOR LICENSE ASSISTED ACCESS

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/085,949

(22) Filed: Mar. 30, 2016

(65) Prior Publication Data

US 2016/0295611 A1 Oct. 6, 2016

Related U.S. Application Data

(60) Provisional application No. 62/142,275, filed on Apr. 2, 2015.

(51) Int. Cl.
*H04W 74/08* (2009.01)
*H04W 16/10* (2009.01)
(Continued)

(52) U.S. Cl.
CPC ........... *H04W 74/0808* (2013.01); *H04L 5/00* (2013.01); *H04L 5/003* (2013.01); *H04L 5/0078* (2013.01);
(Continued)

(58) Field of Classification Search
CPC ..... H04W 74/08; H04W 16/14; H04W 72/04; H04W 16/10; H04L 5/00; H04L 5/0078; H04L 5/003
See application file for complete search history.

(56) References Cited

U.S. PATENT DOCUMENTS

| | | | |
|---|---|---|---|
| 8,730,990 B2 | 5/2014 | Ghosh et al. | |
| 2011/0096747 A1* | 4/2011 | Seok | H04W 72/04 370/329 |

(Continued)

FOREIGN PATENT DOCUMENTS

| | | |
|---|---|---|
| EP | 2649744 | 6/2012 |
| EP | 2757850 | 7/2014 |

(Continued)

OTHER PUBLICATIONS

ZTE, "PHY layer solutions for LAA design", 3GPP TSG RAN WG1 Meeting #80, Athens Greece, R1-150152, Feb. 2015.*
(Continued)

*Primary Examiner* — Mewale A Ambaye
(74) *Attorney, Agent, or Firm* — Austin Rapp

(57) ABSTRACT

An evolved NodeB (eNB) is described that includes a processor and memory in electronic communication with the processor. Instructions stored in the memory are executable to perform a channel sensing on a Licensed-Assisted Access (LAA) secondary cell (SCell) for a transmission. The instructions are also executable to manage a counter based on whether or not the channel is sensed to be idle. The instructions are further executable to determine whether or not the eNB performs the transmission if the counter reaches zero. The instructions are additionally executable to perform the transmission if determined, otherwise suspend the transmission and perform an additional channel sensing for the transmission.

8 Claims, 14 Drawing Sheets

(51) Int. Cl.
  *H04L 5/00* (2006.01)
  *H04W 16/14* (2009.01)
  *H04W 72/04* (2009.01)
(52) U.S. Cl.
  CPC ........... *H04W 16/10* (2013.01); *H04W 16/14* (2013.01); *H04W 72/04* (2013.01); *H04W 74/08* (2013.01)

(56) References Cited

U.S. PATENT DOCUMENTS

| | | | |
|---|---|---|---|
| 2012/0218983 | A1* | 8/2012 | Noh .................. H04B 7/0452 370/338 |
| 2013/0336156 | A1 | 12/2013 | Wei et al. |
| 2014/0031054 | A1 | 1/2014 | Zou et al. |
| 2014/0071959 | A1 | 3/2014 | Ghosh et al. |
| 2014/0112289 | A1* | 4/2014 | Kim .................. H04W 16/14 370/329 |
| 2016/0242175 | A1* | 8/2016 | Dama .................. H04W 74/08 |
| 2016/0345344 | A1* | 11/2016 | Larsson ............. H04W 72/1289 |
| 2018/0084432 | A1* | 3/2018 | Kwak .................. H04L 27/26 |

FOREIGN PATENT DOCUMENTS

| | | |
|---|---|---|
| WO | 2012040520 | 3/2012 |
| WO | 2012139278 | 10/2012 |
| WO | 2013126858 | 8/2013 |
| WO | 2013167557 | 11/2013 |
| WO | 2014111309 | 7/2014 |

OTHER PUBLICATIONS

Search Report and Written Opinion issued for International Application No. PCT/US2016/025310 dated Jun. 27, 2016.
CATT, "Design of frame-based LBT for LAA", 3GPP TSG RAN WG1 Meeting #80, Athens Greece, R1-150109, Feb. 2015.
Alcatel-Lucent Shanghai Bell, "Discussions on Transmission Modes for LAA DL", 3GPP TSG RAN WG1 Meeting #80, Athens Greece, R1-150195, Feb. 2015.
Sharp, "Frequency reuse factor for LAA", 3GPP TSG RAN WG1 Meeting #80, Athens Greece, R1-150282, Feb. 2015.
NTT DOCOMO, Inc., "Discussion on frame structure and LBT mechanism for LAA", 3GPP TSG RAN WG1 Meeting #80, Athens Greece, R1-150416, Feb. 2015.
Nokia Networks, Nokia Corporation, "On LTE LAA inter-cell interference management mechanisms", 3GPP TSG RAN WG1 Meeting #80, Athens Greece, R1-150456, Feb. 2015.
Intel Corporation, "LBT design for LAA downlink", 3GPP TSG RAN WG1 Meeting #80, Athens Greece, R1-150089, Feb. 2015.
Samsung, "Discussion on LAA Hidden Node Issue", 3GPP TSG RAN WG1 Meeting #80, Athens Greece, R1-150369, Feb. 2015.
Huawei, HiSilicon, "Discussion of hidden node problem of LAA", 3GPP TSG RAN WG1 Meeting #80, Athens Greece, R1-150404, Feb. 2015.
Institute for Information Industry (III), "Solutions to DL LAA Hidden Node and Channel Reuse", 3GPP TSG RAN WG1 Meeting #80, Athens Greece, R1-150420, Feb. 2015.
Intel Corporation, "Hidden Node Problem and Potential Remedies for LAA Downlink", 3GPP TSG RAN WG1 Meeting #80, Athens Greece, R1-150504, Feb. 2015.
MediaTek Inc., "Discussions on LAA frame structure design and LAA-WiFi coexistence", 3GPP TSG RAN WG1 Meeting #80, Athens Greece, R1-150577, Feb. 2015.
3GPP TR 36.889 V0.22 "Technical Specification Group Radio Access Network; Study on Licensed-Assisted Access to Unlicensed Spectrum (Release 13)," R1-150949, Feb. 2015.
Huawei, HiSilicon, "Design of initial downlink transmission for LBE-based LAA", 3GPP TSG RAN WG1 Ad-hoc Meeting, Paris, France, R1-150980 Mar. 26, 2015.
Huawei, HiSilicon, "Details of CCA procedure for LAA-LAA coexistence", 3GPP TSG RAN WG1 ad hoc Meeting, Paris, France, R1-150979 Mar. 26, 2015.

* cited by examiner

SYSTEMS AND METHODS FOR PERFORMING CHANNEL SENSING FOR LICENSE ASSISTED ACCESS

RELATED APPLICATIONS

This application is related to and claims priority from U.S. Provisional Patent Application No. 62/142,275, entitled "SYSTEMS AND METHODS FOR LICENSE ASSISTED ACCESS," filed on Apr. 2, 2015, which is hereby incorporated by reference herein, in its entirety.

TECHNICAL FIELD

The present disclosure relates generally to communication systems. More specifically, the present disclosure relates to systems and methods for licensed assisted access (LAA).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
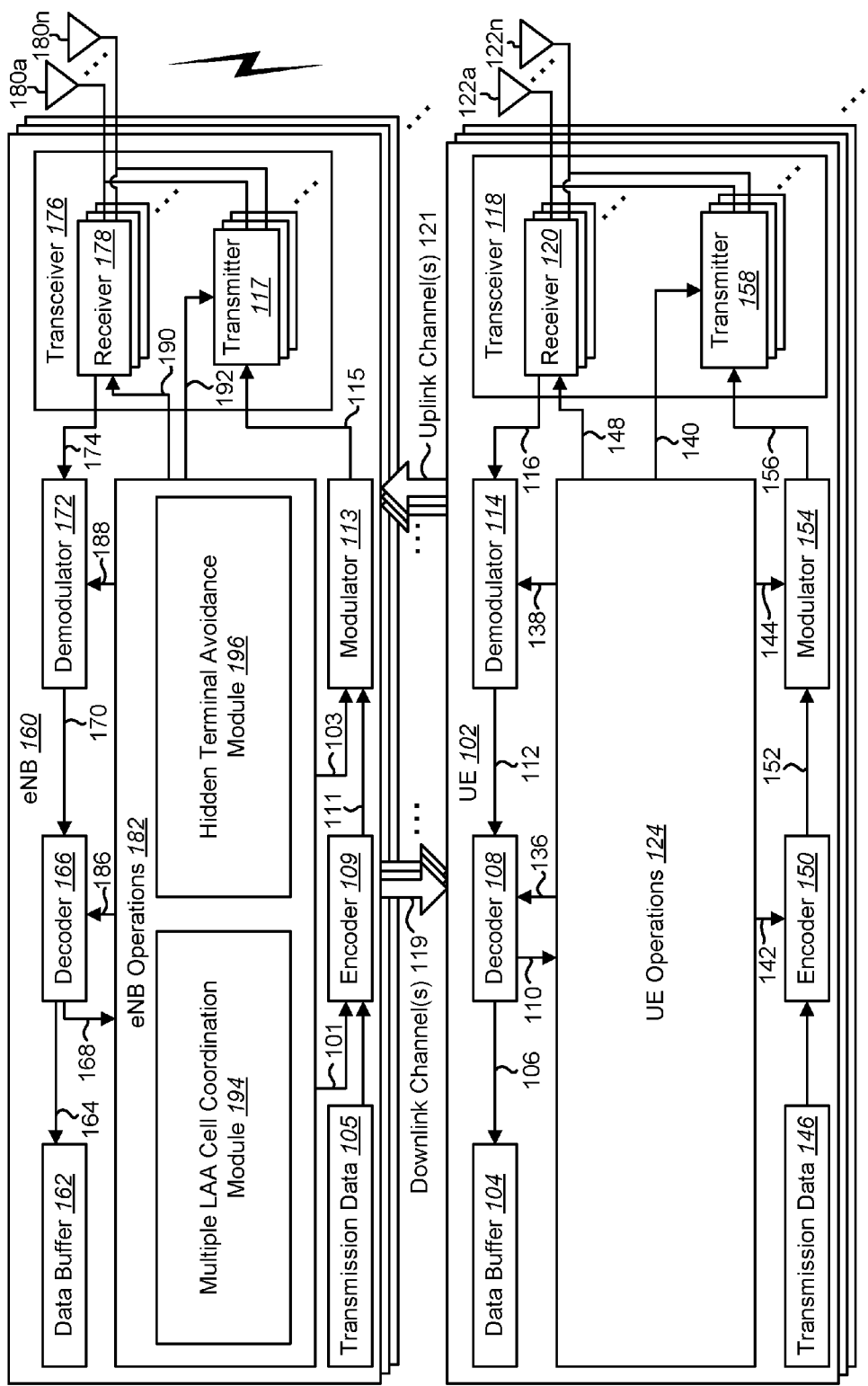
FIG. 1 is a block diagram illustrating one implementation of one or more evolved NodeBs (eNBs) and one or more user equipments (UEs) in which systems and methods for licensed assisted access (LAA) may be implemented.

An evolved NodeB (eNB) is described that includes a processor and memory in electronic communication with the processor. Instructions stored in the memory are executable to perform a channel sensing on a Licensed-Assisted Access (LAA) secondary cell (SCell) for a transmission. The instructions are also executable to manage a counter based on whether or not the channel is sensed to be idle. The instructions are further executable to determine whether or not the eNB performs the transmission if the counter reaches zero. The instructions are additionally executable to perform the transmission if determined, otherwise suspend the transmission and perform an additional channel sensing for the transmission.

The instructions may be executable to determine that the eNB does not perform the transmission if another cell does not sense the channel as idle when the counter reaches zero.

A method for an eNB is also described. The method includes performing a channel sensing on a LAA SCell for a transmission. The method also includes managing a counter based on whether or not the channel is sensed to be idle. The method further includes determining whether or not the eNB performs the transmission if the counter reaches zero. The method additionally includes performing the transmission if determined, otherwise suspending the transmission and performing an additional channel sensing for the transmission.

The eNB may determine that the eNB does not perform the transmission if another cell does not sense the channel as idle when the counter reaches zero.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-assisted access (LAA) may support LTE in unlicensed spectrum. In a LAA network, the downlink (DL) transmission may be scheduled in an opportunistic manner. Thus, listen before talk (LBT) with clear channel assessment (CCA) may be performed before a LAA transmission. The LBT with the CCA may employ backoff algorithms (i.e., generating a backoff counter, decrementing the backoff counter value if channel is sensed to be idle, keeping the backoff counter value otherwise, and starting transmission if the backoff counter reaches zero) to reduce the collision probability of a LAA transmission with other unlicensed signals.

The backoff algorithms may be applied on each LAA serving cell or LAA transmitting node. However, the contention mechanisms of backoff procedures try to avoid simultaneous transmissions from different LAA cells. This may be desirable for WiFi-based transmission because all packets have the same header structure. On the other hand, simultaneous subframe transmissions in LTE (e.g., with coordinated multipoint (CoMP) transmission) may be beneficial to improve the overall system throughput and increase spectrum efficiency.

Systems and methods for managed simultaneous LAA transmissions when multiple LAA serving cells share the same unlicensed carrier and are controlled by the same eNB scheduler are described herein. Additionally, systems and methods are described to avoid undesirable simultaneous transmissions from multiple LAA cells. Furthermore, systems and methods are described to avoid a hidden terminal issue among cells that are managed by the same eNB or the same operator. The described systems and methods may be achieved by a coordinated management of backoff counters among LAA cells managed by the same eNB or operator.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122*a-n*. For example, a UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during an uplink (UL) subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a multiple LAA cell coordination module 194 and a hidden terminal avoidance module 196.

For unlicensed spectrum, contention access mechanisms are required so that the unlicensed devices can have some fair access. Typically, listen-before-talk (LBT) may be performed. If the channel is sensed as busy, an unlicensed device should defer the transmission and contend for access when the channel is idle again. If two or more unlicensed devices capture the same channel at the same time, a collision occurs. The packets may not be received correctly due to the collision and interference from other packets. Thus, a multiple access channel may be treated as a single channel with exclusive usage by a single unlicensed device.

This approach is good for WiFi-type asynchronous transmissions. But for LTE, coordinated multi-point (CoMP) transmission is supported. The CoMP transmission may include joint processing or coordinated scheduling. Simultaneous transmissions from adjacent transmit points or cells can be used to improve the overall system throughput and spectrum efficiency.

If scheduled wisely, simultaneous LAA transmissions from adjacent LAA cells on the same carrier may be considered. On the other hand, since LAA is a scheduled transmission by a scheduler, the scheduler may avoid a collision if multiple LAA nodes get the channel at the same time and simultaneous transmission is not desirable.

As used herein, the term LAA cell refers to a set of communication channels between a UE 102 and an eNB 160 in which LAA operations may be performed. A LAA cell refers to a serving cell that operates on an unlicensed carrier. In current definition, a LAA cell can only be a secondary cell, and is configured by a licensed cell. A LAA cell may also be referred to as a LAA serving cell.

Additionally, a hidden terminal issue exists if the transmitter cannot sense another transmission close to the receiver. An example of the hidden terminal issue is described in connection with FIG. 5 below.

LAA extends LTE transmission on unlicensed band. Unlike 802.11 where the same preamble sequence and header format/modulation is used by all stations, a LTE signal is scrambled with information including a cell identity and scrambling sequences. Thus, the LTE signal is more robust with interference mitigation techniques. A collision with another LTE signal may cause some degradation of a LTE signal and should be avoided. On the other hand, in some cases, simultaneous LTE transmission may be beneficial to the overall throughput or spectrum efficiency. Some examples of simultaneous LTE transmission are discussed in FIG. 6.

To avoid the hidden terminal problem and undesirable collisions, and to take advantage of simultaneous LTE transmissions for LAA, detailed solutions on channel access and backoff mechanisms may defined as described herein.

In one implementation, multiple LAA cell operation may be defined. In a typical LAA small cell scenario, a common scheduler schedules one or more licensed cells and one or more LAA small cells under each licensed cell. The deployment of LAA small cells is managed by operators. Multiple LAA cells in an area may be controlled by the same scheduler (e.g., by the same eNB 160) or managed by the same operator.

In licensed small cell scenarios, the LTE cell DL transmission is always present in each cell. Thus, interference from adjacent cells can be very serious. CoMP methods can be used to improve the cell-edge UE 102 throughputs by joint processing. For example, joint processing may include transmitting the same signal from multiple points. Alternatively, coordinated scheduling and coordinated beamforming (CS/CB) may be used so that the interference from adjacent cells to a UE 102 is minimized. Furthermore, inter-cell interference coordination (ICIC) methods may be employed to mitigate the problem. For example, an almost blank subframe may be used in an adjacent cell.

With license-assisted access on an unlicensed carrier, a LAA cell cannot transmit all the time. A LAA transmission should occur if it has data to be transmitted and if the channel is not occupied by other unlicensed transmissions. Therefore, a LAA signal should have less interference from adjacent LAA cells. Moreover, joint processing and CS/CB from multiple LAA cells can further enhance the system throughput and spectrum efficiency.

In one approach for LAA transmission without coordination among adjacent LAA cells, in each LAA cell, listen before talk (LBT) with clear channel assessment (CCA) is required before a LAA transmission. To reduce the collision probability, some backoff mechanisms are needed. Thus, the backoff mechanisms are performed independently in each LAA node.

If a LAA node (e.g., eNB 160) has data to transmit, the LAA node may perform CCA detection and a contention access mechanism. It should be noted that the detailed backoff mechanisms and the CCA timeslot sizes may be performed according to known approaches.

A LAA node may acquire the channel and start to transmit LAA subframes if the LAA node sensed a CCA timeslot as idle and the backoff counter reaches 0. If one LAA node obtains the channel and starts transmission, the other adjacent LAA nodes sense the channel as busy and will not transmit.

Collision or simultaneous LAA transmissions may occur only if multiple LAA transmit points get channel access at the same LAA CCA timeslot. A simplified flowchart for a LAA cell is described in connection with FIG. 7.

If no multiple LAA cooperation is applied, there may be two potential issues. In a first case, the LAA transmission may become exclusive. In this case, simultaneous LAA transmission from multiple LAA cells cannot be scheduled even if it is desirable. In a second case, if multiple LAA cells obtain the channel at the same time, simultaneous LAA transmissions may occur even if it is not desirable and causes collision. It should be noted that to obtain the channel by a LAA cell means that the eNB 160 is allowed to transmit a downlink signal immediately on the given LAA cell. However, the scheduler may determine not to transmit on the LAA cell.

The multiple LAA cell coordination module 194 may perform coordinated LAA backoff with simultaneous LAA transmissions. For LAA eNBs 160 under the same scheduler (i.e., under the same eNB 160 or managed by the same operator), the scheduler may have knowledge of the adjacent cells of each LAA node, the CCA detection result and the backoff counter of each LAA node. The feedback information can be used to achieve different functions. For example, the feedback information may be used for hidden terminal avoidance and CoMP transmissions. The available feedback information can be used for cooperative multiple LAA cell operations.

The approaches disclosed herein can be achieved by managing backoff counters at each LAA cell. It should be noted that the approaches disclosed herein are independent of the backoff algorithms and the CCA slot sizes used. Furthermore, the approaches disclosed herein may be employed independently or jointly with each other.

In a first approach, the multiple LAA cell coordination module 194 may perform a coordinated LAA backoff with simultaneous LAA transmissions. With coordinated operation, the scheduler maintains a list of LAA cells or transmit points (TP) in an area. The scheduler may also know the relative location of each LAA cell. For example, for each LAA cell, the scheduler may have a list of adjacent LAA cells of the given LAA cell that operate on the same unlicensed carrier. Furthermore, the scheduler may know the CCA detection result and the backoff counter of each LAA node.

For each LAA cell or TP, listen before talk (LBT) with clear channel assessment (CCA) is required before a LAA transmission. The backoff mechanisms are also performed independently in each LAA node. If a LAA node has data to transmit, it may perform CCA detection and a contention access mechanism. A LAA node may obtain the channel and transmit LAA subframes if it senses a CCA timeslot as idle and the backoff counter reaches 0. The coordinated operation may be performed if at least one of the LAA nodes managed by the same scheduler obtains the channel.

There are several cases to be considered. In a first case, only one LAA node/cell/TP obtains the channel in a CCA timeslot. This case is described in more detail in connection with FIG. 8. In a second case, multiple LAA cells obtain the channel at the same CCA timeslot. This case is described in more detail in connection with FIG. 9.

In a second approach, the hidden terminal avoidance module 198 may perform coordinated LAA procedures with hidden terminal avoidance and collision avoidance. As described above, the hidden terminal issue exists in contention access networks. In WiFi, a request to send (RTS)/clear to send (CTS) message exchange is used to preempt the channel. In LAA, such a mechanism may be difficult to implement, especially for downlink (DL)-only LAA transmissions.

In LAA, the UL feedback of instantaneous channel condition from the UE 102 side is not possible. However, for LAA eNBs 160 under the same scheduler (i.e., under the same eNB 160 or managed by the same operator), the scheduler may have the information of the adjacent cells of each LAA node. For example, the scheduler may have the CCA detection results and the backoff counter of the adjacent cells of each LAA node. Thus, both coordinated multipoint (CoMP) transmission operations and hidden node issues can be solved by managing the backoff counters at the LAA nodes under the same scheduler.

For LAA nodes under the same scheduler, the eNB 160 can obtain the adjacent LAA cell information for each LAA node by either LAA cell detection or operator deployment. Each LAA node may maintain its own CCA and LBT operation, and each LAA node may manage its own backoff counter, which is known to the common scheduler. This approach is described in more detail in connection with FIG. 10.

With coordinated LAA cells operation, the functions for simultaneous transmission and hidden terminal avoidance can be applied jointly or independently at the scheduler. These functions can be achieved with the following benefits. Desirable simultaneous LAA transmissions (e.g., CoMP-like schemes) from multiple LAA cells may be performed. Undesirable simultaneous LAA transmissions when multiple LAA cells obtain the channel in the same timeslot may be avoided. Hidden terminals may be avoided by using CCA detection feedback of adjacent cells.

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
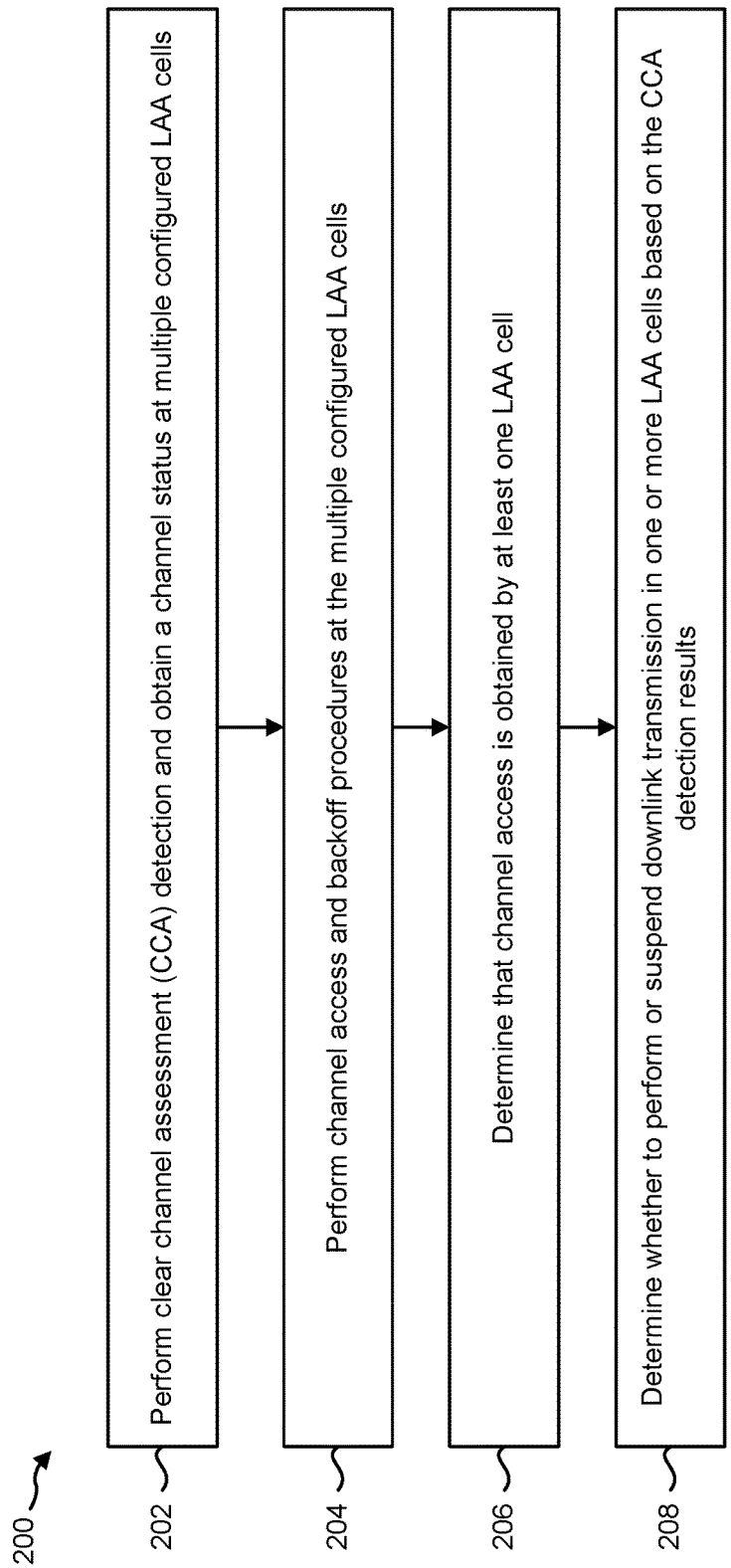
FIG. 2 is a flow diagram illustrating a method for scheduling multiple LAA cells by an eNB.

FIG. 2 is a flow diagram illustrating a method 200 for scheduling multiple Licensed-Assisted Access (LAA) cells by an eNB 160. The eNB 160 may perform 202 CCA detection and obtain the channel status at multiple configured LAA cells. For example, the eNB 160 may determine whether the channel is busy in a CCA timeslot for a given LAA cell. If the LAA cell is transmitting or the CCA detects another transmission on the same LAA carrier, then the channel is determined to be busy. The eNB 160 may determine that the channel is idle in a CCA timeslot for the given LAA cell if the CCA detects no transmission on the same LAA carrier.

The eNB 160 may perform 204 channel access and backoff procedures at multiple configured LAA cells. For example, the eNB 160 may determine a backoff counter value of a given LAA cell based on the CCA detection result of the given LAA cell.

The eNB 160 may determine 206 that channel access is obtained by at least one LAA cell. For example, the eNB 160 may determine that a first LAA cell obtains the channel if the first LAA cell detects the channel as idle in the CCA timeslot and its backoff counter reaches 0. The eNB 160 may determine whether there are other LAA cells that obtain the channel in the same timeslot.

The eNB 160 may determine 208 whether to perform or suspend downlink transmission in one or more LAA cells based on the CCA detection results. For example, the eNB 160 may determine a first LAA cell for LAA transmission. The eNB 160 may then determine if simultaneous LAA transmissions from other LAA cells on the same carrier are desirable or beneficial. The eNB 160 may determine whether to suspend transmission or start LAA transmission from another LAA node.

If simultaneous LAA transmission from one or more LAA cells on the same carrier is desirable or beneficial, then the eNB 160 may set the backoff counter of the given LAA cell to zero. The eNB 160 may also schedule LAA transmission from the given LAA cell. The eNB 160 may further perform simultaneous transmission on the LAA cells that are determined for LAA transmissions. It should be noted that the same eNB 160 that schedules the transmission may perform simultaneous transmission on the LAA cells. Multiple LAA cell operation may be under the control of the same operator and same scheduler (an eNB 160 or eNBs 160 with ideal backhaul between each other).

If simultaneous LAA transmission from one or more LAA cells on the same carrier is not desirable or not beneficial, then the eNB 160 may perform a backoff procedure on a given adjacent cell of the first LAA cell.

If simultaneous LAA transmission from one or more given LAA cells that obtain the channel in the same timeslot as the first LAA cell is not desirable or not beneficial, then the eNB 160 may suspend transmission from the given LAA cells. The eNB 160 may also start a new backoff procedure on the given LAA cells (e.g., start an additional channel sensing for the transmissions on the given LAA cells). The eNB 160 may also perform transmission on other LAA cells that are determined for LAA transmissions.

When determining that channel access is obtained by the first LAA cell, the eNB 160 may also determine adjacent LAA cells on the same carrier as the first LAA cell based on location information of LAA cells or the feedback of each configured LAA cell. The eNB 160 may determine whether there is a hidden terminal near the first LAA cell that obtains the channel.

If any of the adjacent LAA cells of the first LAA cell detects the channel as busy, then the eNB 160 may determine that there is a hidden terminal near the first LAA cell that obtains the channel. The eNB 160 may suspend the transmission from the first LAA cell. The eNB 160 may start a new backoff procedure on the first LAA cell (e.g., start an additional channel sensing for the transmissions on the first LAA cell).

If all of the adjacent LAA cells of the first LAA cell detect the channel as clear or idle, then the eNB 160 may determine that there is no hidden terminal near the first LAA cell that obtains the channel. The eNB 160 may transmit LAA subframes on the first LAA cell.

Figure 3:
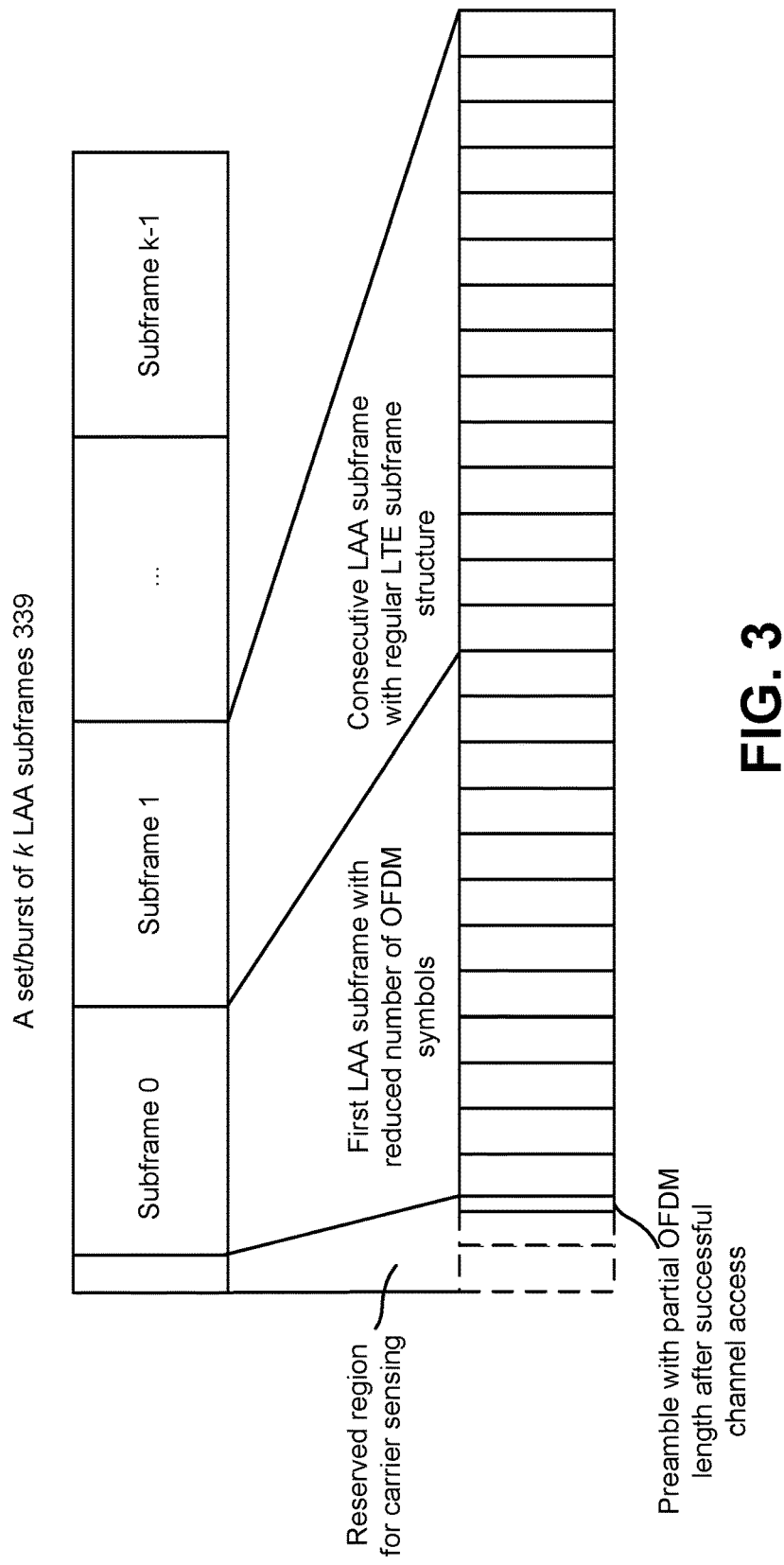
FIG. 3 illustrates an example of a LAA subframe burst transmission.

FIG. 3 illustrates an example of a LAA subframe burst transmission. This transmission may also be referred to as a LAA subframe set transmission. To provide fairness to other networks on the same unlicensed carrier, the eNB 160 may configure a maximum number of continuous subframe transmissions k in a LAA cell (e.g., a set of LAA subframes or a burst of LAA subframes 339). The maximum transmission time in an unlicensed carrier may be different in different regions and/or countries based on the regulatory requirements.

In this example, the subframe is configured with normal cyclic prefix. The first two OFDM symbol lengths are reserved for carrier sensing. Thus, subframe 0 in a set of LAA subframes is a subframe with a reduced number of symbols. A preamble with a partial OFDM length may be transmitted after a successful channel access in front of the first LAA subframe with a reduced number of OFDM symbols. No sensing is necessary for continuous LAA subframe transmission after the first LAA subframe. The regular LTE subframe structure may be applied on consecutive subframes in a LAA subframe set.

It should be noted that the subframe index number in FIG. 3 refers to the index in a LAA subframe burst, instead of the subframe index in a radio frame as in legacy LTE cells.

Figure 4:
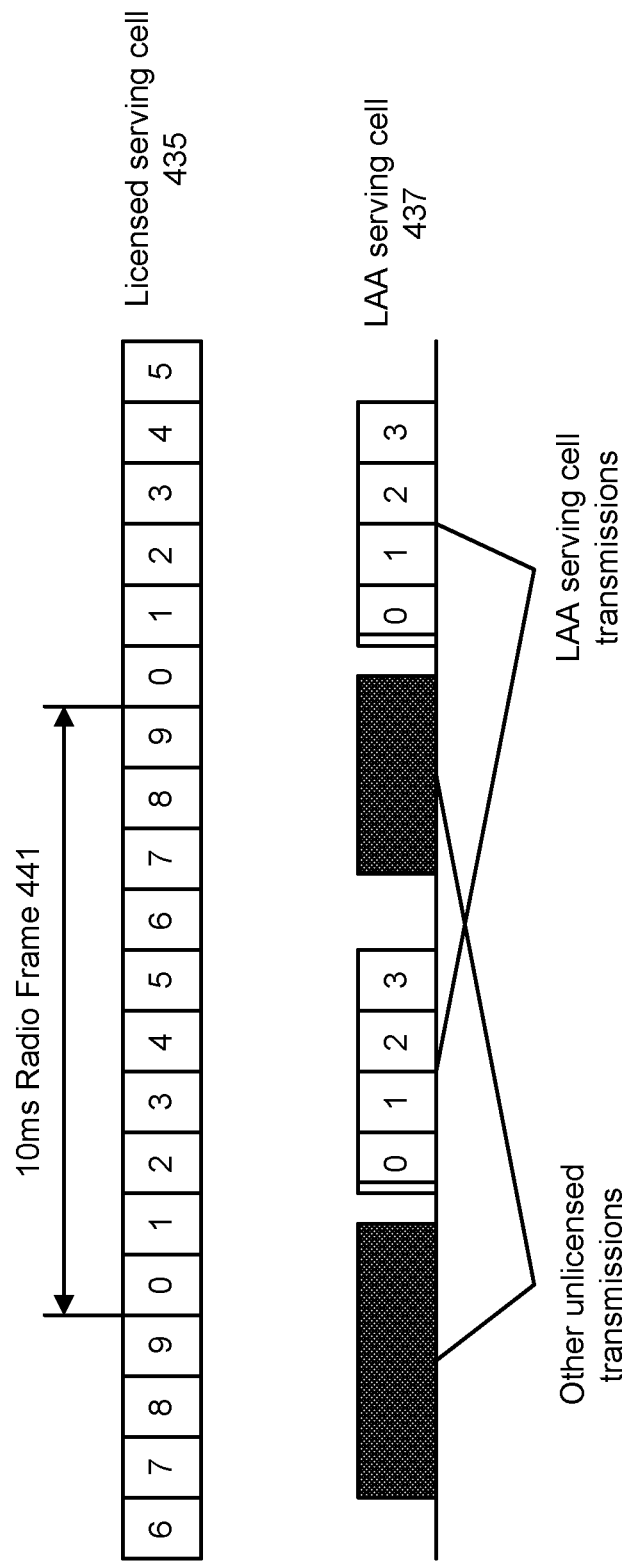
FIG. 4 illustrates an example of LAA coexistence with other unlicensed transmissions.

FIG. 4 illustrates an example of LAA coexistence with other unlicensed transmissions. A licensed serving cell 435 is shown with a 10 ms radio frame 441. A LAA serving cell 437 has LAA serving cell transmissions and other unlicensed transmissions (e.g., Wi-Fi or other LAA cells). Due to carrier sensing and deferred transmissions, the starting of a LAA transmission may be any subframe index in the radio frame 441 of the licensed frame structure.

Figure 5:
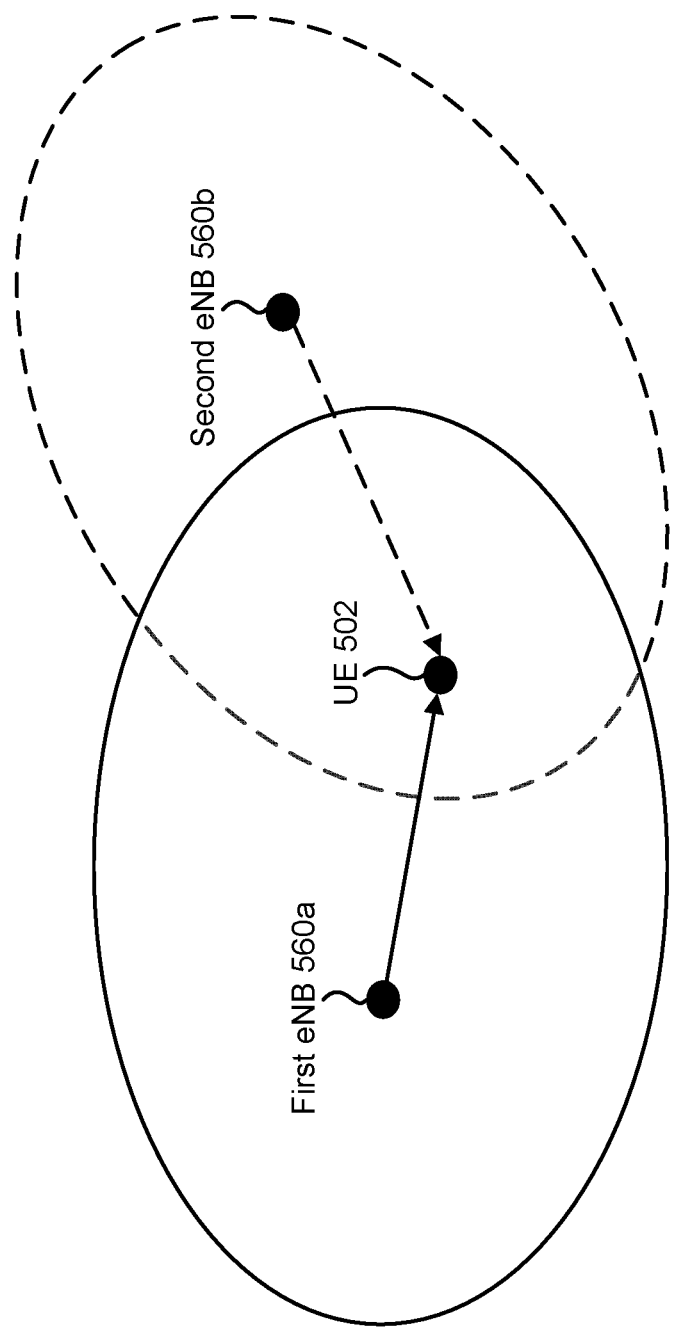
FIG. 5 illustrates an example of a hidden terminal issue with unlicensed transmissions.

FIG. 5 illustrates an example of a hidden terminal issue with unlicensed transmissions. The hidden terminal issue exists if a transmitter cannot sense another transmission close to the receiver. As shown in FIG. 5, the first eNB 560*a* may transmit to a UE 502, but the first eNB 560*a* cannot hear the transmission of a second eNB 560*b*. In this case, when a transmission from the first eNB 560*a* starts, the transmission may collide with another transmission from the second eNB 560*b*.

In 802.11-based WiFi, a request-to-send (RTS) and clear-to-send (CTS) message exchange may be used to avoid the hidden terminal issue. However, for LAA, there is no immediate feedback from the receiver device (e.g., the UE 502) since LTE timing requires at least a 4 ms gap between a DL and UL message exchange. Thus, alleviating the hidden terminal issue without explicit message exchange at the physical (PHY) layer is beneficial.

Figure 6:
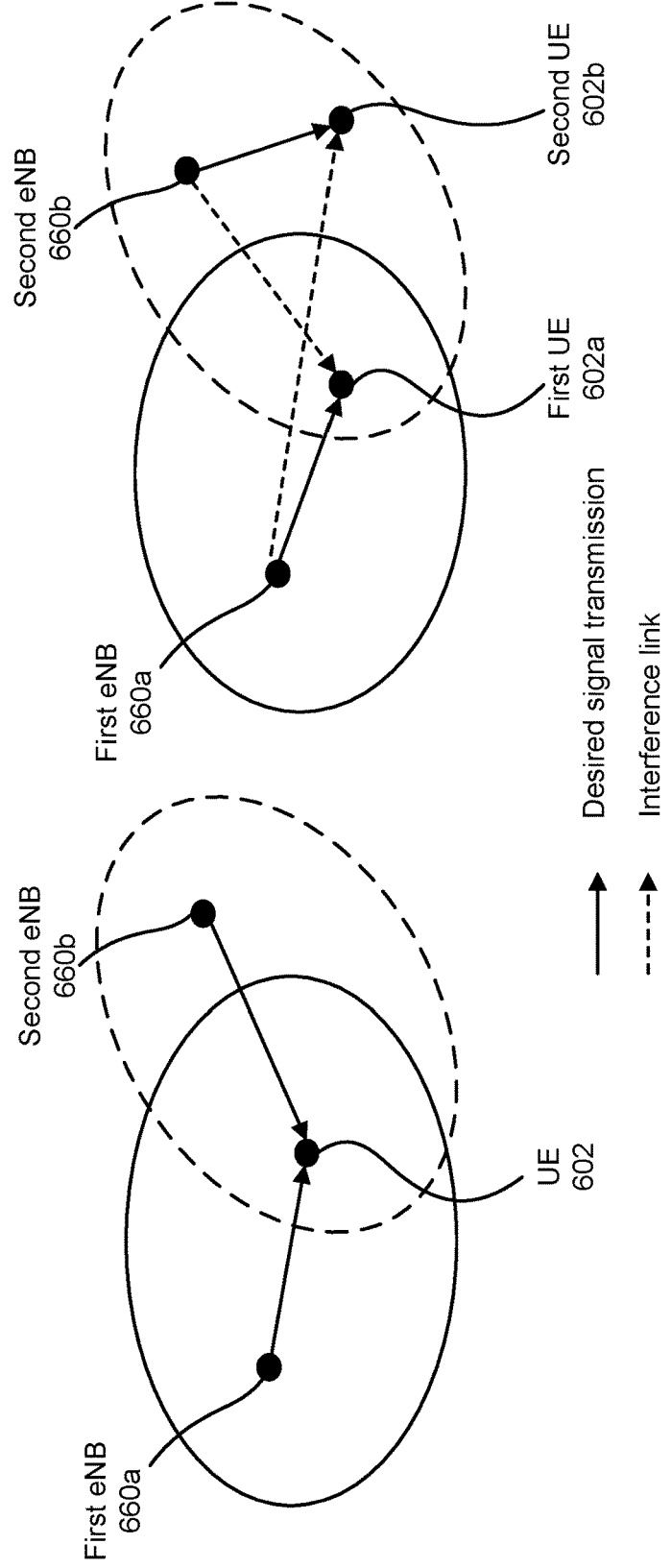
FIG. 6 illustrates examples of simultaneous Long Term Evolution (LTE) transmissions on a single carrier.

FIG. 6 illustrates examples of simultaneous LTE transmissions on a single carrier. Frequency reuse and coordinated multi-point (CoMP) transmission are some examples of simultaneous LTE transmissions on a single carrier. Different CoMP schemes may be employed to enhance the performance.

As discussed above, the LAA extends LTE transmission on unlicensed band. Some examples of simultaneous LTE transmission are discussed in FIG. 6. In a first example (Example A), joint transmission (JT) may be used where the same signal is transmitted to a single UE 602 from different transmit points (TPs) to improve the signal. In this first example, the TPs may include a first eNB 660*a* and a second eNB 660*b* that transmit the same signal to a UE 602.

A second example (Example B) involves coordinated scheduling and coordinated beamforming (CS/CB) where different subframes are transmitted to different UEs 602*a-b*. In this second example, a first eNB 660*a* may transmit a desired signal to a first UE 602*a*. An interference link is also transmitted from the first eNB 660*a* to a second UE 602*b*. A second eNB 660*b* may transmit a desired signal to the second UE 602*b*. An interference link is also transmitted from the second eNB 660*b* to the first UE 602*b*.

As observed in these examples, for LAA, exclusive unlicensed transmission may be too restrictive. Therefore, coordinated simultaneous transmission may be considered as described herein.

Figure 7:
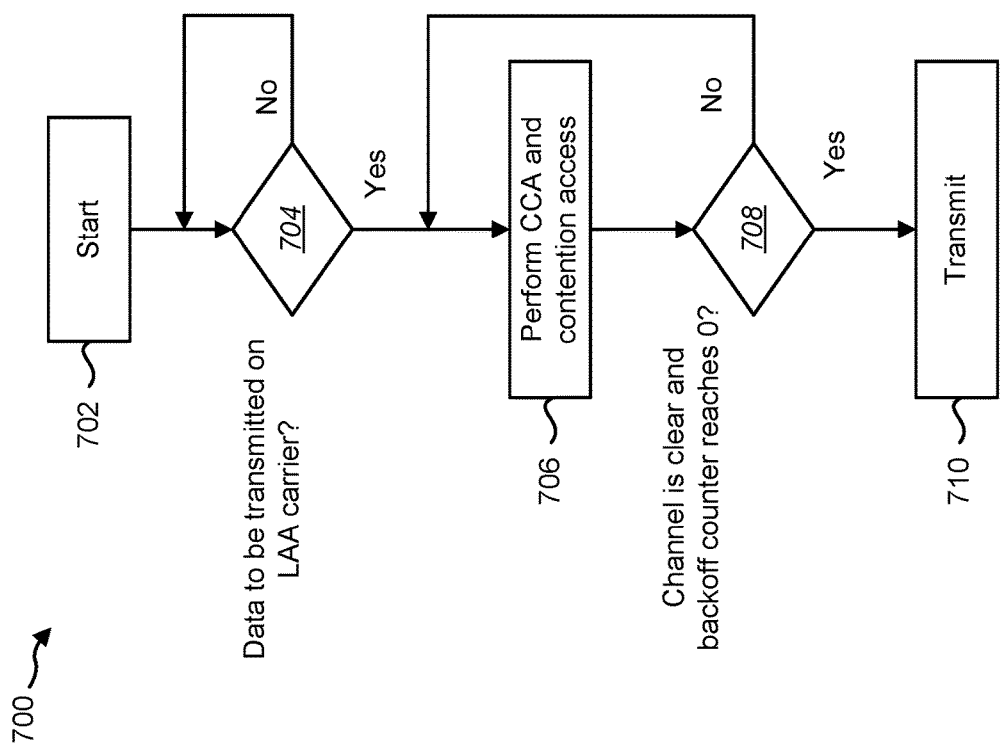
FIG. 7 is a flow diagram illustrating a method for distributed LAA contention access without coordination among LAA cells.

FIG. 7 is a flow diagram illustrating a method 700 for distributed LAA contention access without coordination among LAA cells. The method 700 may be performed by an eNB 160. Collision or simultaneous LAA transmissions may occur only if more than one LAA transmit point gets channel access at the same LAA CCA timeslot.

Upon starting 702 the method 700, the eNB 160 may determine 704 whether there is data to be transmitted on a LAA carrier. If there is no data to be transmitted on the LAA carrier, the eNB 160 may wait until there is data to be transmitted.

If there is data to transmit on a LAA carrier, the eNB 160 may perform 706 CCA detection and a contention access mechanism. For unlicensed spectrum, contention access mechanisms are required so that the unlicensed devices can have some fair access. Typically, listen-before-talk (LBT) may be performed.

The eNB 160 may determine 708 whether the channel is clear and a backoff counter reaches zero. If the channel is sensed as busy, an unlicensed device should defer the transmission and contend for access when the channel is idle again. The eNB 160 may perform another CCA detection and contention access. If the eNB 160 determines that the channel is clear and the backoff counter reaches zero, then the eNB 160 may transmit 710 data on the LAA carrier.

If two or more unlicensed devices capture the same channel at the same time, a collision occurs. The packets may not be received correctly due to the collision and interference from other packets. If no multiple LAA cooperation is applied, there may be two potential issues. In a first case, the LAA transmission may become exclusive. In this case, simultaneous LAA transmission from multiple LAA cells cannot be scheduled even if it is desirable. In a second case, if multiple LAA cells obtain the channel at the same time, simultaneous LAA transmissions may occur even if it is not desirable and causes collision. Therefore, the eNB 160 may coordinate the transmission on multiple LAA cells as described in connection with FIGS. 8-10.

Figure 8:
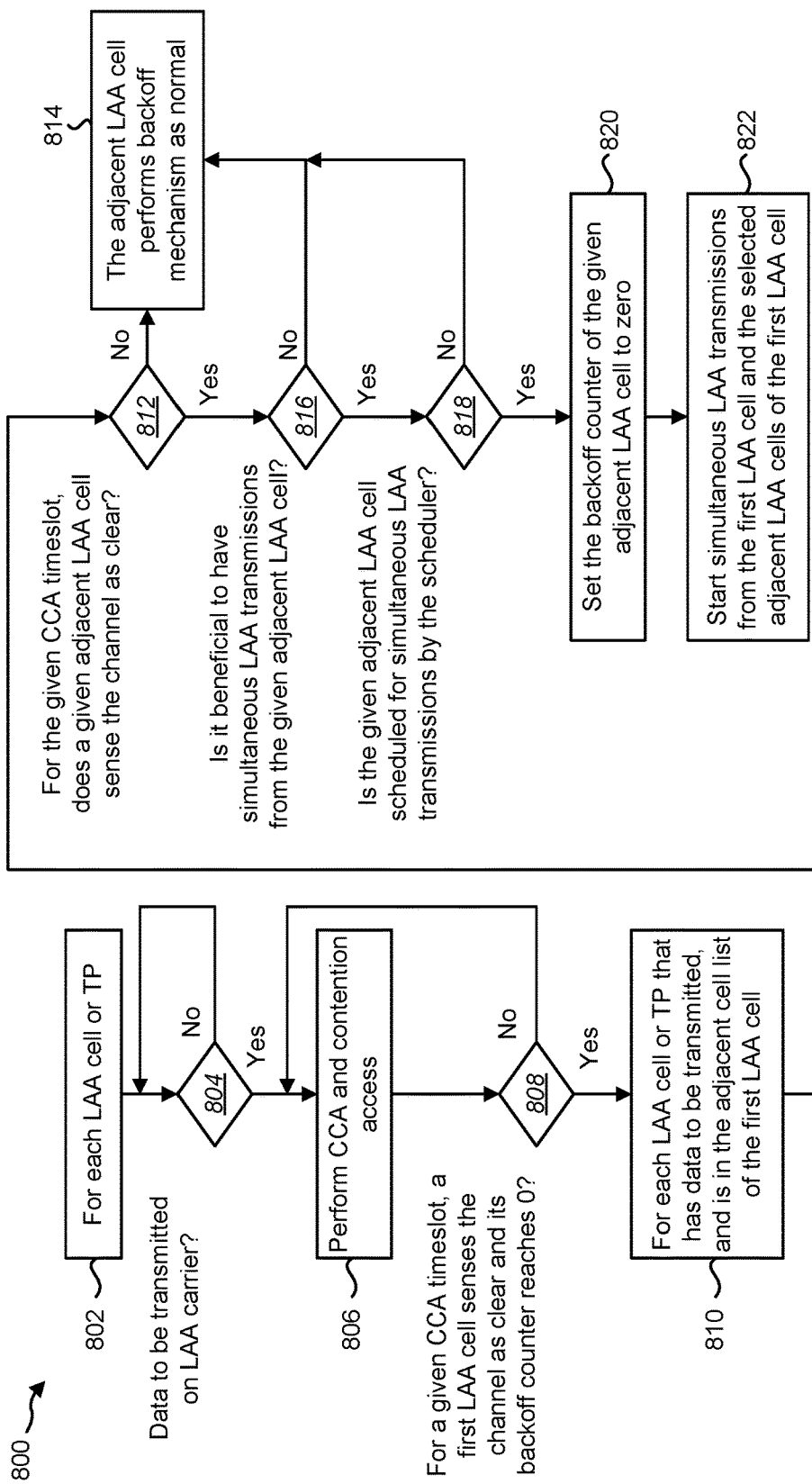
FIG. 8 is a flow diagram illustrating a method for simultaneous LAA transmissions with coordinated LAA cell operation.

FIG. 8 is a flow diagram illustrating a method 800 for simultaneous LAA transmissions with coordinated LAA cell operation. The method 800 may be performed by an eNB 160. In this case, only one LAA cell obtains a channel in a CCA timeslot.

The eNB 160 may be a scheduler. As described above, in a typical LAA small cell scenario, a common scheduler schedules one or more licensed cells and one or more LAA small cells under each licensed cell. The deployment of LAA small cells is managed by operators. Multiple LAA cells in an area may be controlled by the same scheduler (e.g., by the same eNB 160) or managed by the same operator.

For each LAA cell or transfer point (TP) (Step 802), the eNB 160 may determine 804 whether there is data to be transmitted on a LAA carrier. If there is no data to be transmitted on a LAA carrier, the eNB 160 may wait until there is data to be transmitted. If there is data to transmit on a LAA carrier, the eNB 160 may perform 806 CCA detection and a contention access mechanism.

For a given CCA timeslot, the eNB 160 may determine 808 whether a first LAA cell senses the channel as clear and whether the backoff counter for the first LAA cell reaches zero. If the channel is sensed as busy, an unlicensed device should defer the transmission and contend for access when the channel is idle again. The eNB 160 may perform another CCA detection and contention access for each LAA cell or TP.

If the eNB 160 determines that the channel is clear and the backoff counter reaches zero for the first LAA cell, then for each LAA cell or TP, the eNB 160 may determine 810 whether the LAA cell or TP has data to transmit. The eNB 160 may also determine whether the LAA cell or TP is in the adjacent cell list of the first LAA cell.

The scheduler (e.g., eNB 160) can evaluate the adjacent LAA cells to figure out whether simultaneous transmission from other LAA adjacent cells can enhance the overall performance. In a CCA timeslot, if the first LAA cell obtains the channel (i.e., the first LAA cell has data to transmit) and the first LAA cell senses the channel as idle by CCA detection and its backoff counter reaches 0, the scheduler may schedule immediate LAA transmission from the first LAA cell.

Furthermore, the scheduler may check the adjacent LAA cells of the first LAA cell. A LAA cell may be an adjacent LAA cell if it is in an adjacent cell list of a given LAA cell. For each LAA cell or TP that has data to be transmitted and is in the adjacent cell list of the first LAA cell, the scheduler should check the CCA detection results in the given CCA timeslot.

The eNB 160 may determine 812 whether an adjacent LAA cell detects the channel as clear in the given CCA timeslot. If the adjacent LAA cell detects the channel as busy, the adjacent CCA cell should perform 814 backoff mechanism as normal.

If the adjacent LAA cell detects the channel is idle (i.e., clear) in the given CCA timeslot, the eNB 160 may determine 816 whether it is beneficial to have simultaneous LAA transmissions from the given adjacent LAA cell. In other words, the scheduler may further evaluate if simultaneous LAA transmission from the adjacent LAA cell is beneficial to the overall system performance. For example, the eNB 160 may determine whether the simultaneous LAA transmission from the adjacent LAA cell enhances throughput or spectrum efficiency.

If simultaneous transmission from the adjacent LAA cell is not beneficial to the overall system performance, then the adjacent LAA cell may perform 814 backoff mechanism as normal. If simultaneous transmission from the adjacent LAA cell is beneficial to the overall system performance, the eNB 160 may determine 818 whether the given adjacent LAA cell is scheduled for simultaneous LAA transmissions. If the given adjacent LAA cell is not scheduled for simultaneous LAA transmissions, then the adjacent LAA cell may perform 814 backoff mechanism as normal.

If the given adjacent LAA cell is scheduled for simultaneous LAA transmissions, then eNB 160 (e.g., scheduler) may set 820 the backoff counter of the given adjacent LAA cell to zero. The eNB 160 may start 822 a simultaneous LAA transmission from the given adjacent LAA cell together with the first LAA cell.

As described herein, the eNB 160 may determine which adjacent LAA cell and how many adjacent LAA cells may participate in the simultaneous LAA transmissions. The process can be viewed as a water-filling method to achieve maximum overall spectrum efficiency.

Figure 9:
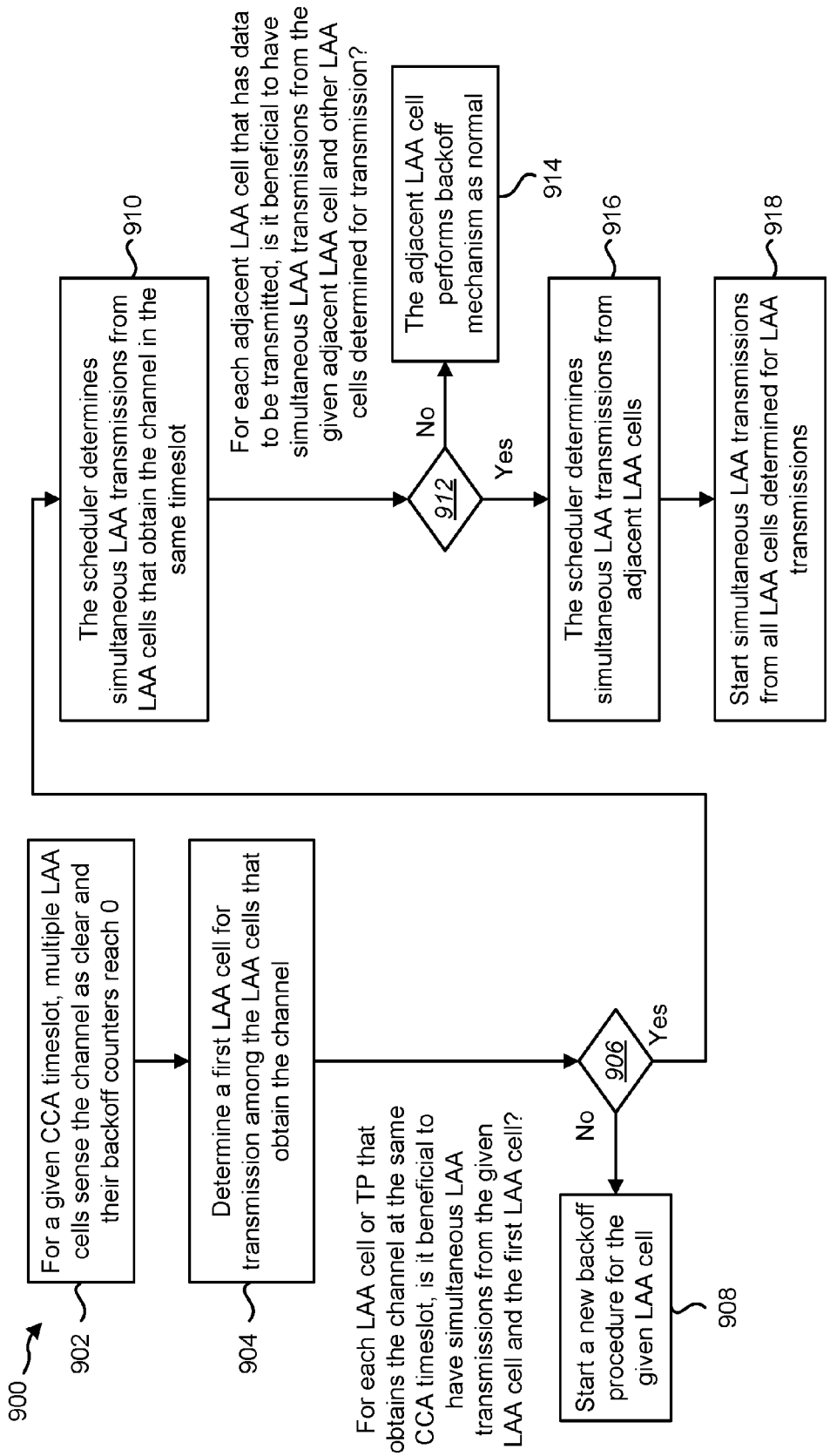
FIG. 9 is a flow diagram illustrating a method for coordinated transmission when multiple LAA cells obtain channel access.

FIG. 9 is a flow diagram illustrating a method 900 for coordinated transmission when multiple LAA cells obtain channel access. The method 900 may be performed by an eNB 160. In this case, more than one LAA cells obtain the channel at the same CCA timeslot. In other words, multiple LAA nodes may have data to transmit. The eNB 160 may be a scheduler for multiple LAA cells in an area.

For a given CCA timeslot, the eNB 160 may determine 902 that multiple LAA cells sense a channel as clear (e.g., idle) and their backoff counters reach zero. In a LAA network without coordination, simultaneous transmission may occur, which may provide beneficial simultaneous transmissions (e.g., may enhance throughput or spectrum efficiency) or may cause undesirable packet collision.

The eNB 160 may determine 904 a first LAA cell for transmission from among the LAA cells that obtain the channel. With coordinated operation, the scheduler knows the backoff counters of each scheduled LAA cell. Thus, if multiple LAA cells obtain the channel at the same CCA timeslot, the eNB 160 may first evaluate if simultaneous LAA transmissions from these LAA cells is beneficial for overall system performance. For each LAA cell or TP that obtains the channel at the same CCA timeslot, the eNB 160 may determine 906 whether the simultaneous LAA transmissions from these LAA cells provide enhanced throughput or spectrum efficiency.

If a simultaneous LAA transmission from a given LAA cell that obtains the channel at the same CCA timeslot is not beneficial, the eNB 160 may start 908 a new backoff procedure for the given LAA cell. In other words, for a LAA cell, if it is not beneficial for overall system performance, the eNB 160 may ignore the contention access and start 908 a new backoff procedure on the given LAA cell. For example, the eNB 160 may re-initiate the backoff counter with a random number within the contention window size. If simultaneous LAA transmission from a LAA cell is beneficial for overall system performance, the eNB 160 may schedule 910 simultaneous LAA transmissions from these LAA cells.

After evaluating the LAA cells that obtain the channel at the same CCA timeslot, the eNB 160 can further evaluate 912 the adjacent LAA cells scheduled for transmission based on whether simultaneous LAA transmission is beneficial to the overall spectrum efficiency. The same evaluation method can be used as described in connection with FIG. 8 above.

If a simultaneous LAA transmission from a given adjacent LAA cell is not beneficial, then the eNB 160 may instruct the adjacent LAA cell to perform 914 a backoff mechanism as normal. If a simultaneous LAA transmission from a given adjacent LAA cell is beneficial, then the eNB 160 may schedule 916 simultaneous LAA transmissions from the given adjacent LAA cell. The eNB 160 may then start 918 the simultaneous LAA transmissions from all LAA cells determined for LAA transmissions.

The cooperative multiple LAA cell operation may allow simultaneous LAA transmissions from a LAA cell even if it does not capture the channel by itself. Furthermore, the cooperative multiple LAA cell operation may avoid undesirable simultaneous LAA transmission when multiple LAA cells obtain the channel at the same time.

Figure 10:
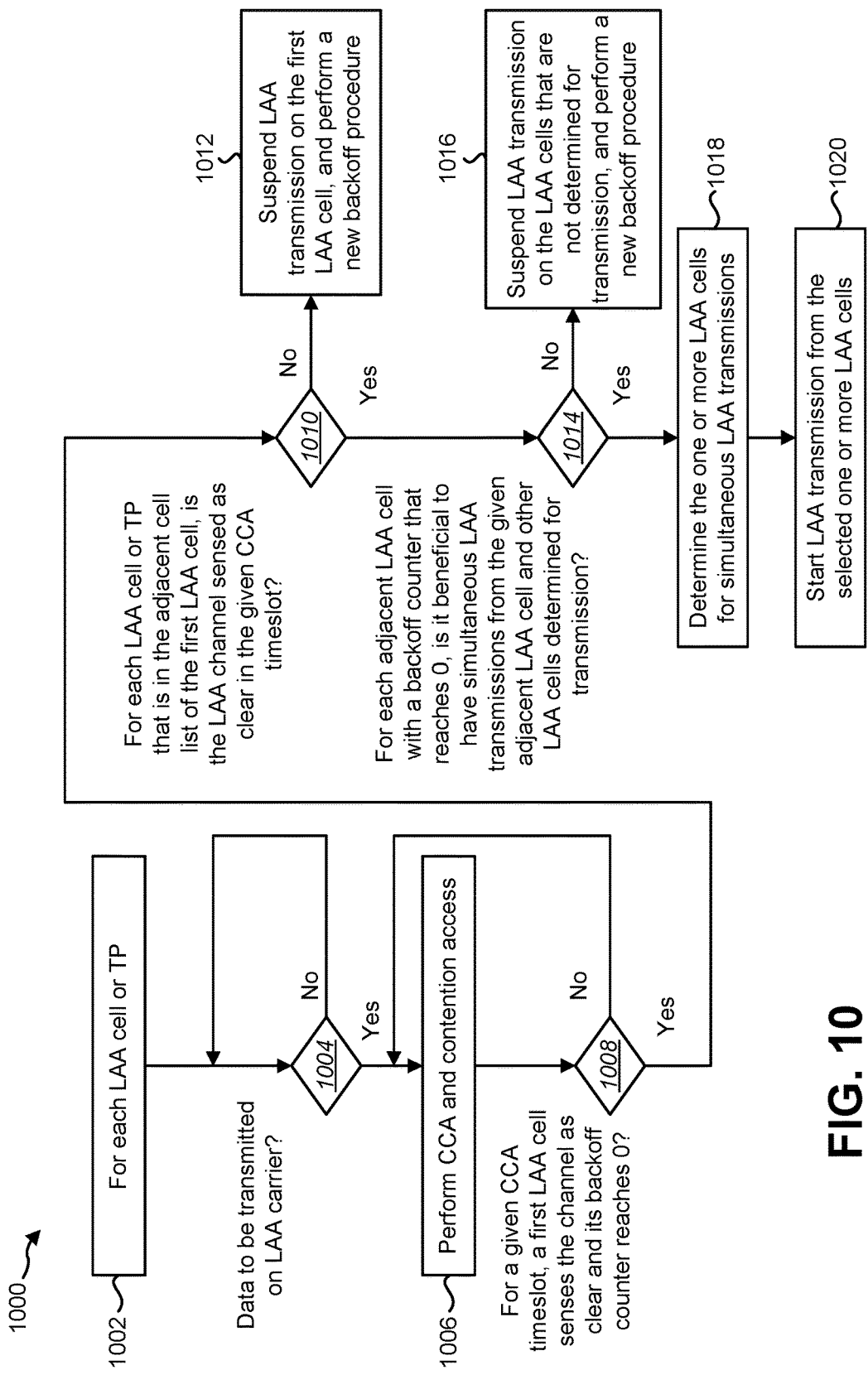
FIG. 10 is a flow diagram illustrating a method for coordinated LAA operation with hidden terminal avoidance.

FIG. 10 is a flow diagram illustrating a method 1000 for coordinated LAA operation with hidden terminal avoidance. The method 1000 may be performed by an eNB 160. The eNB 160 may be a scheduler for multiple LAA cells in an area. The eNB 160 may perform coordinated LAA procedures with hidden terminal avoidance and collision avoidance.

As described above, the hidden terminal is an important issue for unlicensed access. Normally, interactive message exchange is required to avoid collision with a transmission from a hidden terminal that is near the receiver that but is not known to the transmitter. The 802.11 handles hidden terminal issue with a RTS/CTS message exchange. The RTS clears the channel around the transmitter, and CTS clears the channel around the receiver.

The issue becomes more serious for LAA because of the lack of immediate feedback. In LTE, the timing between a DL and UL is at least 4 ms, and vice versa. With LAA, the channel condition after 4 ms can be totally different. Furthermore, instantaneous and continuous feedback from a LAA UE 102 may incur too much overhead and may be too costly on the licensed or unlicensed uplink.

With LAA cells in an area managed by the same scheduler, the CCA detection results and backoff counters of each LAA node are known to the scheduler. Such information may be used to overcome hidden terminal issues for LAA without explicit physical layer message exchange.

For each LAA cell or transfer point (TP) (Step 1002), the eNB 160 may determine 1004 whether there is data to be transmitted on a LAA carrier. If there is no data to be transmitted on a LAA carrier, the eNB 160 may wait until there is data to be transmitted. If there is data to transmit on a LAA carrier, the eNB 160 may perform 1006 CCA detection and a contention access mechanism.

For a given CCA timeslot, the eNB 160 may determine 1008 whether a first LAA cell senses the channel as clear and whether the backoff counter for the first LAA cell reaches zero. If the channel is sensed as busy, an unlicensed device should defer the transmission and contend for access when the channel is idle again. The eNB 160 may perform another CCA detection and contention access for each LAA cell or TP.

If the first LAA cell, or a LAA node, obtains a LAA channel (i.e., the LAA cell senses the channel is idle in a CCA timeslot) and the backoff counter reduces to zero, then before the LAA transmission, the eNB 160 should check the CCA detection results of the given CCA timeslot and the backoff counters in adjacent LAA cells of the first LAA cell. The eNB 160 may determine 1010 if an adjacent LAA cell of the first LAA serving cell senses the channel is busy in the same CCA timeslot.

If an adjacent LAA cell of the first LAA serving cell senses the channel is busy in the same CCA timeslot, then there are ongoing transmissions near the given adjacent LAA cell. To avoid the hidden terminal issue, the eNB 160 may suspend 1012 the LAA transmission for the first LAA cell and may perform a new backoff procedure for the first LAA cell instead. This prevents interference to an ongoing transmission close to the adjacent LAA cell that is hidden from the first LAA cell.

If there is more than one LAA cell or node that obtains the same LAA channel in the same timeslot, then the eNB 160 may avoid undesirable collision from multiple LAA cells. This may be accomplished as described in connection with FIG. 9.

If the eNB 160 determines 1010 that an adjacent LAA cell of the first LAA serving cell senses the channel is busy in the same CCA timeslot, then for each adjacent LAA cell with a backoff counter that reaches 0, the eNB 160 may determine 1014, whether it is beneficial to have simultaneous LAA transmissions from the given adjacent LAA cell and other LAA cells determined for transmission. If it is not beneficial to have simultaneous LAA transmissions from the given adjacent LAA cell and other LAA cells, then the eNB 160 may suspend 1016 LAA transmission on the LAA cells that are not determined for transmission, and perform a new backoff procedure.

If a simultaneous LAA transmission from a given adjacent LAA cell is beneficial, then the eNB 160 may schedule 1018 simultaneous LAA transmissions from the given adjacent LAA cell. The eNB 160 may then start 1020 the simultaneous LAA transmissions from all LAA cells determined for LAA transmissions.

In one implementation, each LAA cell maintains its own backoff process and backoff counter. The eNB 160 performs hidden terminal avoidance and collision avoidance by managing the backoff counters of each LAA cell. In another implementation, multiple LAA cells can be grouped into a LAA cluster, and a common backoff counter is maintained for the cluster. Thus, for the LAA cluster, in a CCA timeslot, the channel is sensed as busy if any LAA cell in the cluster senses the channel is busy. The channel is idle if all LAA cells in the cluster sense the channel is idle.

This method 1000 of hidden terminal avoidance does not need active UE 102 feedback like in RTS/CTS. The most conservative way to implement hidden terminal avoidance is to assume that a hidden terminal exists if any of the adjacent LAA cells detect the channel is occupied. However, as a further enhancement, the LAA scheduler (e.g., eNB 160) may evaluate the hidden terminal problems based on the relative location of the target UE 102. For example, if the UE 102 is close to an adjacent LAA cell that detects the channel as busy, the scheduler should assume a hidden terminal exists and may defer LAA transmission. On the contrary, if the target UE 102 is far from an adjacent LAA cell that detects the channel is busy, the scheduler may perform LAA transmission in the given LAA cell.

Figure 11:
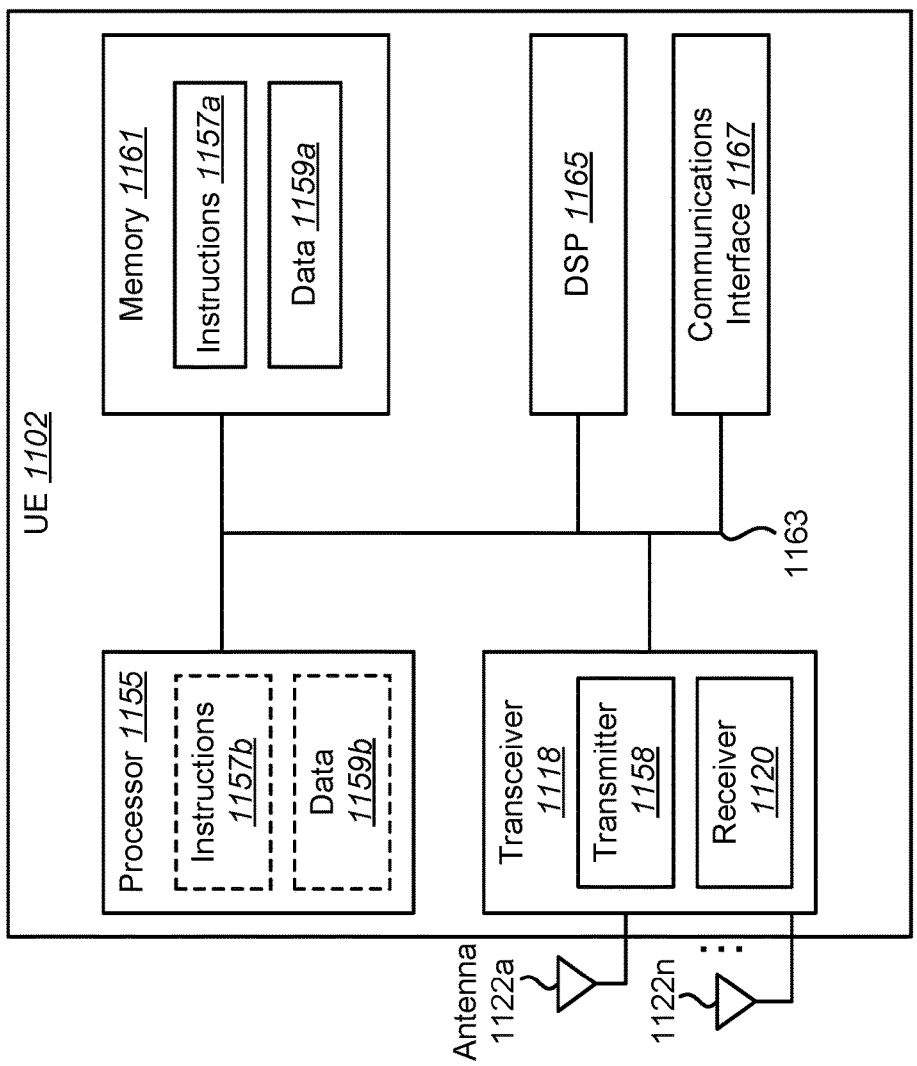
FIG. 11 illustrates various components that may be utilized in a UE.

FIG. 11 illustrates various components that may be utilized in a UE 1102. The UE 1102 described in connection with FIG. 11 may be implemented in accordance with the UE 102 described in connection with FIG. 1. The UE 1102 includes a processor 1155 that controls operation of the UE 1102. The processor 1155 may also be referred to as a central processing unit (CPU). Memory 1161, which may include read-only memory (ROM), random access memory (RAM), a combination of the two or any type of device that may store information, provides instructions 1157*a* and data 1159*a* to the processor 1155. A portion of the memory 1161 may also include non-volatile random access memory (NVRAM). Instructions 1157*b* and data 1159*b* may also reside in the processor 1155. Instructions 1157*b* and/or data 1159*b* loaded into the processor 1155 may also include instructions 1157*a* and/or data 1159*a* from memory 1161 that were loaded for execution or processing by the processor 1155. The instructions 1157*b* may be executed by the processor 1155 to implement one or more of the methods described above.

The UE 1102 may also include a housing that contains one or more transmitters 1158 and one or more receivers 1120 to allow transmission and reception of data. The transmitter(s) 1158 and receiver(s) 1120 may be combined into one or more transceivers 1118. One or more antennas 1122*a-n* are attached to the housing and electrically coupled to the transceiver 1118.

The various components of the UE 1102 are coupled together by a bus system 1163, which may include a power bus, a control signal bus and a status signal bus, in addition to a data bus. However, for the sake of clarity, the various buses are illustrated in FIG. 11 as the bus system 1163. The UE 1102 may also include a digital signal processor (DSP) 1165 for use in processing signals. The UE 1102 may also include a communications interface 1167 that provides user access to the functions of the UE 1102. The UE 1102 illustrated in FIG. 11 is a functional block diagram rather than a listing of specific components.

Figure 12:
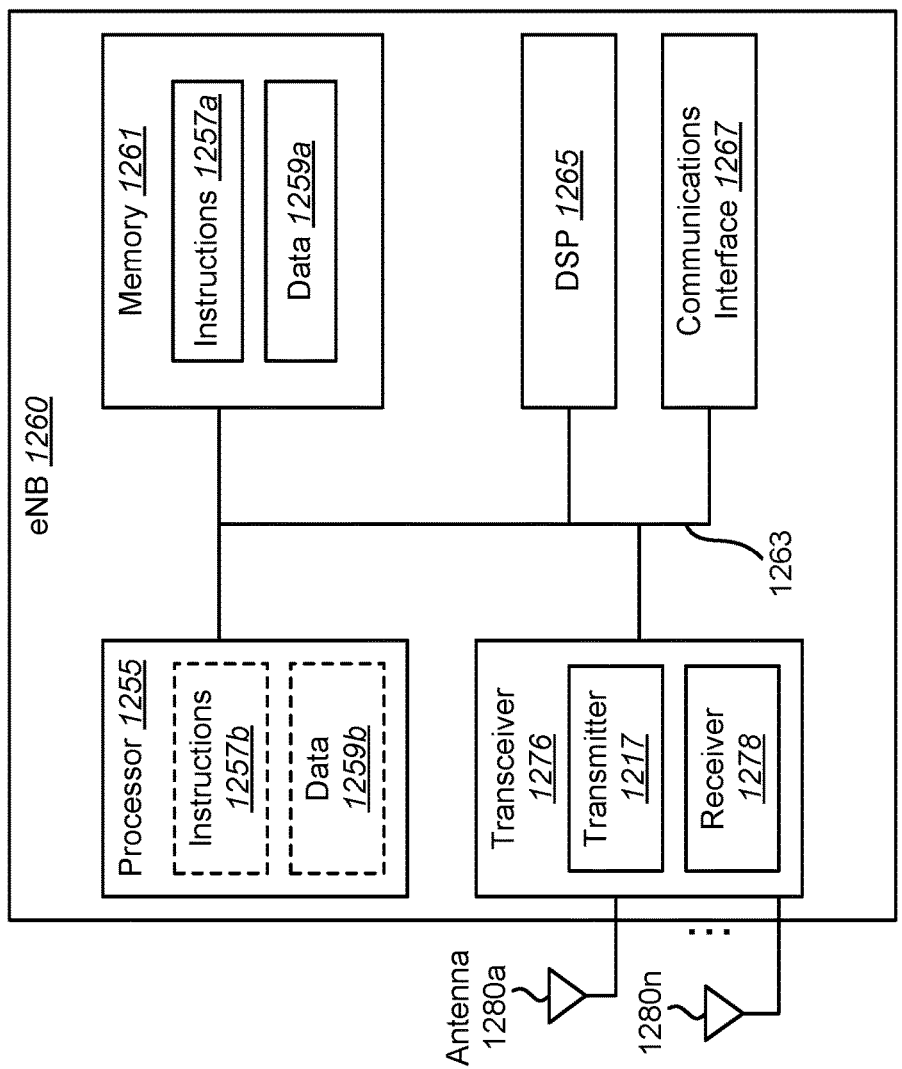
FIG. 12 illustrates various components that may be utilized in an eNB.

FIG. 12 illustrates various components that may be utilized in an eNB 1260. The eNB 1260 described in connection with FIG. 12 may be implemented in accordance with the eNB 160 described in connection with FIG. 1. The eNB 1260 includes a processor 1255 that controls operation of the eNB 1260. The processor 1255 may also be referred to as a central processing unit (CPU). Memory 1261, which may include read-only memory (ROM), random access memory (RAM), a combination of the two or any type of device that may store information, provides instructions 1257*a* and data 1259*a* to the processor 1255. A portion of the memory 1261 may also include non-volatile random access memory (NVRAM). Instructions 1257*b* and data 1259*b* may also reside in the processor 1255. Instructions 1257*b* and/or data 1259*b* loaded into the processor 1255 may also include instructions 1257*a* and/or data 1259*a* from memory 1261 that were loaded for execution or processing by the processor 1255. The instructions 1257*b* may be executed by the processor 1255 to implement one or more of the methods 200, 700, 800, 900 and 1000 described above.

The eNB 1260 may also include a housing that contains one or more transmitters 1217 and one or more receivers 1278 to allow transmission and reception of data. The transmitter(s) 1217 and receiver(s) 1278 may be combined into one or more transceivers 1276. One or more antennas 1280*a-n* are attached to the housing and electrically coupled to the transceiver 1276.

The various components of the eNB 1260 are coupled together by a bus system 1263, which may include a power bus, a control signal bus and a status signal bus, in addition to a data bus. However, for the sake of clarity, the various buses are illustrated in FIG. 12 as the bus system 1263. The eNB 1260 may also include a digital signal processor (DSP) 1265 for use in processing signals. The eNB 1260 may also include a communications interface 1267 that provides user access to the functions of the eNB 1260. The eNB 1260 illustrated in FIG. 12 is a functional block diagram rather than a listing of specific components.

Figure 13:
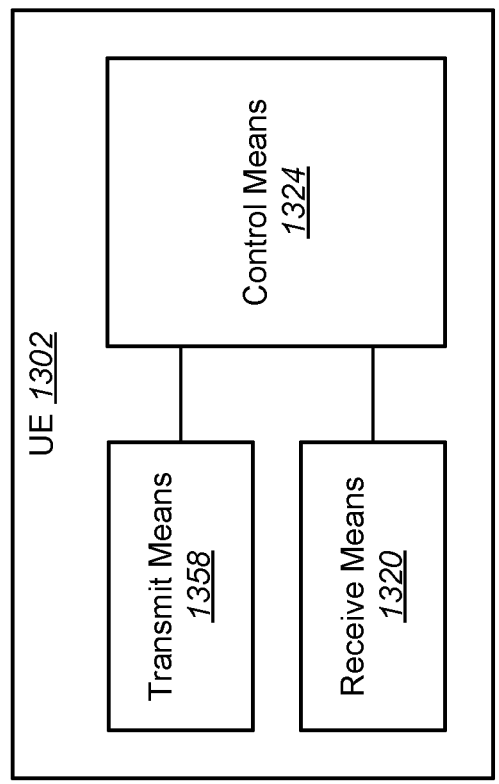
FIG. 13 is a block diagram illustrating one implementation of a UE in which systems and methods for scheduling multiple LAA serving cells may be implemented.

FIG. 13 is a block diagram illustrating one implementation of a UE 1302 in which scheduling multiple LAA serving cells may be implemented. The UE 1302 includes transmit means 1358, receive means 1320 and control means 1324. The transmit means 1358, receive means 1320 and control means 1324 may be configured to perform one or more of the functions described in connection with FIG. 1 above. FIG. 11 above illustrates one example of a concrete apparatus structure of FIG. 13. Other various structures may be implemented to realize one or more of the functions of FIG. 1. For example, a DSP may be realized by software.

Figure 14:
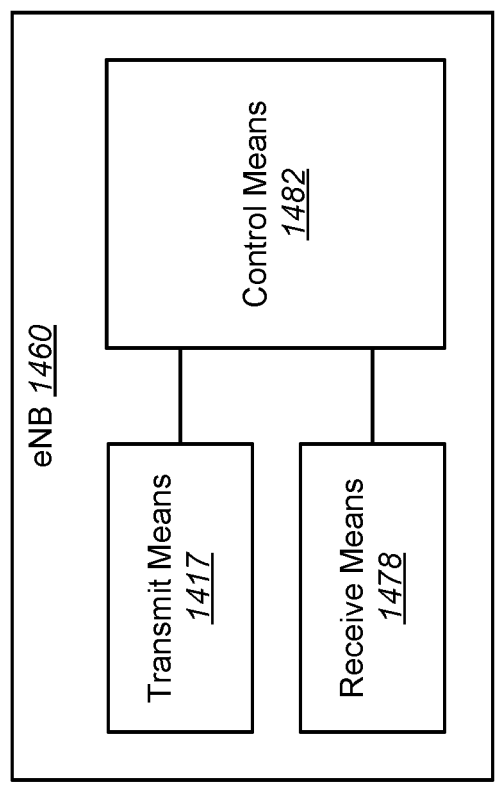
FIG. 14 is a block diagram illustrating one implementation of an eNB in which systems and methods for scheduling multiple LAA serving cells may be implemented.

FIG. 14 is a block diagram illustrating one implementation of an eNB 1460 in which scheduling multiple LAA serving cells may be implemented. The eNB 1460 includes transmit means 1417, receive means 1478 and control means 1482. The transmit means 1417, receive means 1478 and control means 1482 may be configured to perform one or more of the functions described in connection with FIG. 1 above. FIG. 12 above illustrates one example of a concrete apparatus structure of FIG. 14. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. A base station comprising:
   a processor; and
   a memory in electronic communication with the processor, wherein instructions stored in the memory are executable by the processor to:
   perform a channel sensing on a Licensed-Assisted Access (LAA) secondary cell (SCell) for a transmission;
   manage a counter based on whether or not the channel is sensed to be idle;
   determine one of (i) the base station performs the transmission and (ii) the base station does not perform the transmission after the counter reaches zero; and
   perform the transmission in a case that the base station determines to perform the transmission, otherwise defer the transmission and perform an additional channel sensing for the transmission.

2. The base station of claim 1, wherein the instructions are executable by the processor to determine that the base station does not perform the transmission if another cell does not sense the channel as idle when the counter reaches zero.

3. A method for a base station, the method comprising:
   performing a channel sensing on a Licensed-Assisted Access (LAA) secondary cell (SCell) for a transmission;
   managing a counter based on whether or not the channel is sensed to be idle;
   determining one of (i) the base station performs the transmission and (ii) the base station does not perform the transmission after the counter reaches zero; and
   performing the transmission in a case that the base station determines to perform the transmission, otherwise deferring the transmission and performing an additional channel sensing for the transmission.

4. The method of claim 3, wherein the base station determines that the base station does not perform the transmission if another cell does not sense the channel as idle when the counter reaches zero.

5. The base station of claim 1, wherein the transmission includes physical downlink shared channel (PDSCH).

6. The method of claim 3, wherein the transmission includes physical downlink shared channel (PDSCH).

7. The base station of claim 1, wherein
the instructions are executable by the processor to, in a case where the channel is sensed to be idle, manage the counter such that
in a situation in which the counter does not reach zero, the base station decrements the counter by 1 and performs the channel sensing.

8. The method for a base station of claim 3, wherein
in a case where the channel is sensed to be idle, the base station manages the counter such that
in a situation in which the counter does not reach zero, the base station decrements the counter by 1 and performs the channel sensing.

* * * * *